UNITED STATES PATENT OFFICE.

HAROLD C. SCHUSTER, OF OCONOMOWOC, WISCONSIN.

SPRING-LEAF SPREADER.

1,390,167. Specification of Letters Patent. Patented Sept. 6, 1921.

Application filed October 9, 1920. Serial No. 415,924.

*To all whom it may concern:*

Be it known that I, HAROLD C. SCHUSTER, a citizen of the United States, residing at Oconomowoc, in the county of Waukesha and State of Wisconsin, have invented new and useful Improvements in Spring-Leaf Spreaders, of which the following is a specification.

This invention relates to a spring leaf spreader and has for its primary object the construction of a spreader that may be quickly connected to a spring and when operated will act between the pair of leaves at spaced points so as to force the leaves apart.

An object of the invention is to construct a device to be adjustable so as to readily connect to various size springs.

A feature of the invention is the novel construction for locking the jaws in adjusted position.

With these and other objects in view the invention will be better understood from the following detailed description taken in connection with the accompanying drawing wherein.

Figure 1:
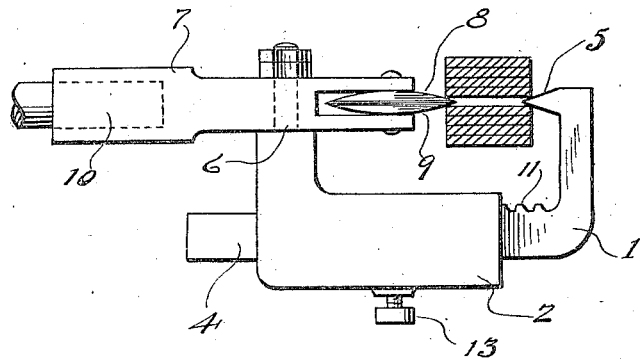
Figure 1 is a side elevation of the spreader showing the spring in section.
Figure 2:
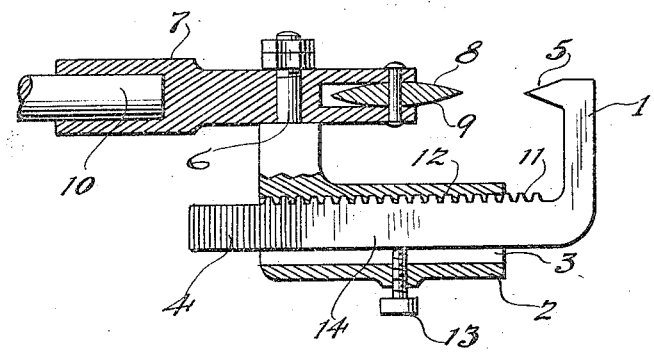
Fig. 2 is a detailed longitudinal sectional view.
Figure 3:
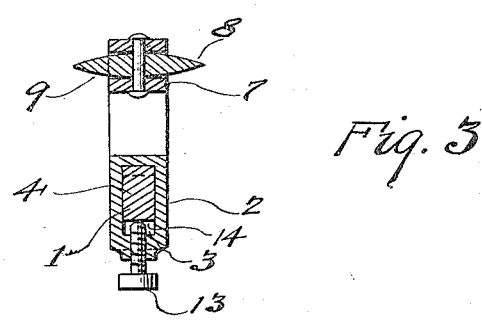
Fig. 3 is a cross sectional view.

Again referring to the drawing illustrating one of the many constructions of my invention the numerals 1 and 2 designate a pair of jaws, one provided with an opening 3 and the other having a shank 4 slidably mounted in the opening. The jaw 1 is provided with a wedge shape lug 5 arranged to be wedged between the spring leaves as shown in Fig. 1. Jaw 2 is provided with a stub shaft extension 6 upon which is swingingly mounted a lever 7. One end of the lever is forked and has mounted therein a roller 8 having a wedge shape periphery 9 to be forced between the spring leaves when the lever is swung in the arc of a circle. As far as I have proceeded it will be seen that the spring leaves are subject to a mechanical action as spaced points thereby distributing the strain and forcing the leaves apart in the most practical manner. If found advantageous in practice the end of the lever may be formed into a socket 10 for receiving a rod to increase the leverage effect.

A very important feature of my invention is the fact that the jaws may be adjusted and substantially locked in adjusted position for accommodating different size springs. The jaw 1 is provided with a series of teeth 11 to be interchangeably arranged in the holes 12 of the jaw 2 for tightly holding the teeth in the holes and further to prevent accidental displacement I provide a thumb screw 13 screw threaded into the jaw 2 and binding against the edge 14 of the shank 4 for exerting binding action for locking the teeth in the holes.

From the foregoing description taken in connection with the accompanying drawing it will be apparent that I provide a device that is capable of exerting great pressure at spaced points for immediately spreading leaf springs and which has very substantial adjustment so as to accommodate different size springs.

It is, of course, to be understood that the invention may be constructed in various other manners and the parts associated in different relations and, therefor, I do not desire to be limited in any manner except as set forth in the claim hereunto appended.

Having thus described my invention what I claim is:

A spring-leaf spreader comprising a jaw having a slot extending therethrough and provided with teeth on the upper inner wall of said slot throughout the entire length of the body, an adjustable jaw extending through said slot and provided with a plurality of teeth for interengagement with the first-named teeth, a stub shaft on said first-named jaw, a lever pivotally mounted upon said stub shaft, a spreading disk rotatably carried by said lever and provided with a wedge-shaped perimeter, said lever provided with a socket in its end remote from said spreading disk, and a rod inserted into said socket to increase the leverage of the lever.

In testimony whereof I affix my signature.

HAROLD C. SCHUSTER.